United States Patent Office 3,049,910
Patented Aug. 21, 1962

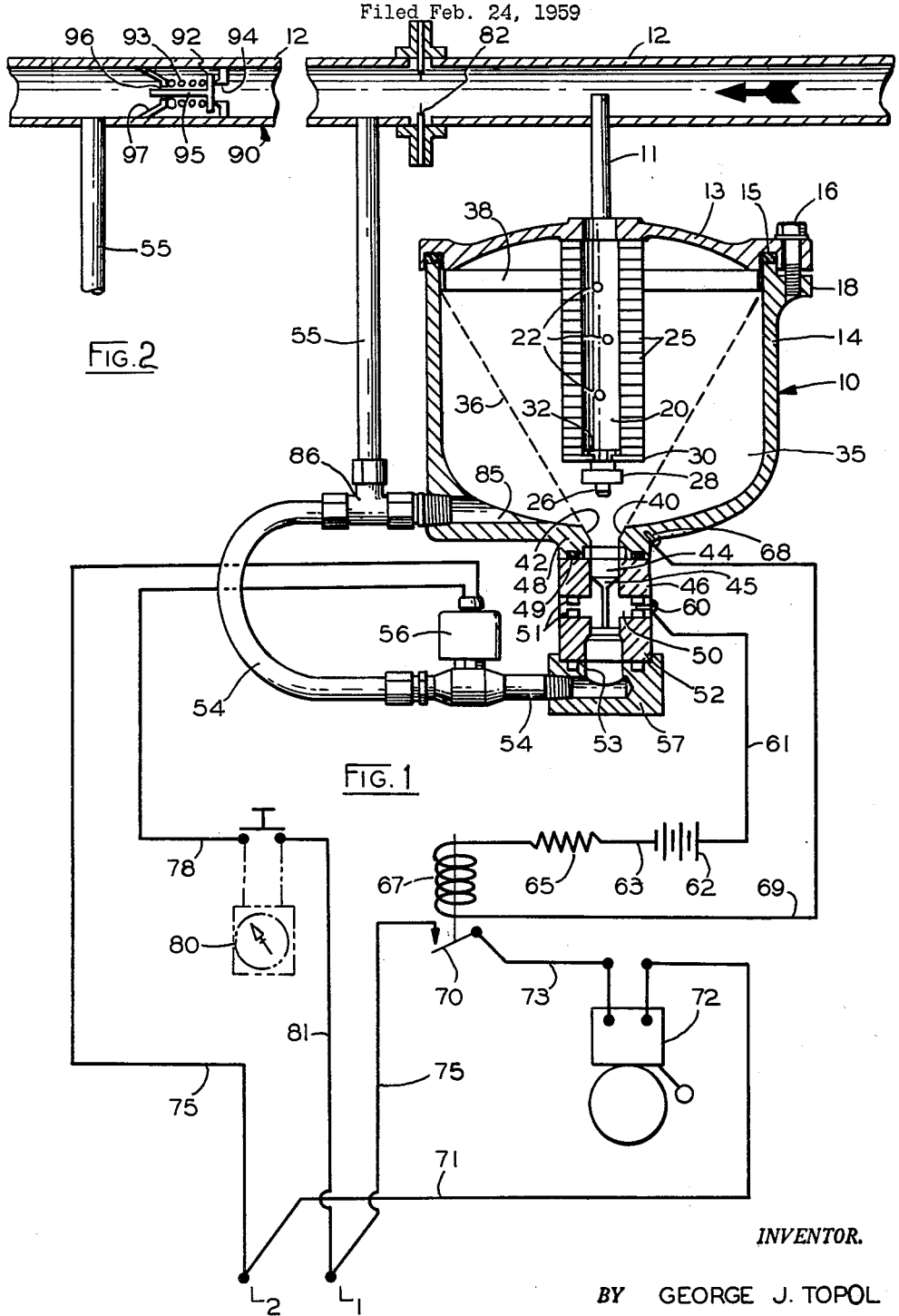

3,049,910
WATER DETECTOR FOR FUELS
George J. Topol, Hamilton, Ontario, Canada, assignor to Bowser, Inc., Fort Wayne, Ind., a corporation of Indiana
Filed Feb. 24, 1959, Ser. No. 795,191
5 Claims. (Cl. 73—53)

This invention relates to an electric water detector for determining the presence of free and emulsified water in liquids, such as fuels and the like.

The presence of water in such liquids as fuels can detract from the value of the fuels, and therefore it becomes of importance to determine the exact degree of water adulteration in order to maintain suitable standards for the fuel. While some devices have been proposed for determining the presence of water, it has been found much more useful to determine the amount and the percentage of water content in order to safeguard the quality of the liquid.

It is, therefore, one of the objects of the invention to provide a detector device which can measure the quantity of water present in a liquid and can be further adapted to render a signal when water content exceeds a predetermined amount or percentage. In a further embodiment, the device will provide a continuous record of the percentage of water content in the liquid.

An important feature of the present invention is that the device operates with a continuous flow of the liquid being tested and continued removal of water is effected to provide information either as to the amount of the water present or as to the percentage of water present in the liquid. The water detection can then be provided with audible warning signals or a continuous record can be made, depending on how the information may be made most useful.

A further object of the invention is to provide a water measuring device of high sensitivity which is capable of measuring very minor percentages of water in a quantity of the accompanying liquid. Moreover the measuring means may include means for coalescing the emulsified water so that it is measured together with the free water thus giving a more accurate evaluation of the liquid being measured for water content.

Other objects and features of the invention will become apparent from a consideration of the following description which proceeds with reference to the accompanying drawings, wherein:

FIGURE 1 is a side elevation view showing the test device in section and the electrical components forming a part thereof; and, FIGURE 2 is a section view of a valve usable in the main header for achieving a constant flow of liquid to said test device regardless of flow rate in the main header.

The test device referred to generally by reference numeral 10 is connected by an inlet line 11 with the main header 12 which contains the mainstream of liquid moving in the direction indicated by the arrow.

The inlet line 11 passes through the cover plate 13 which is fluid tightly sealed over the end of a bowl 14 by means of a gasket 15 and clamping bolts 16 (only one being shown) threadedly received in bosses 18.

The liquid diverted from the main header 12 by the inlet line is passed into the interior of a hollow tubular member 20 having spaced radial openings 22 and a plurality of centrally apertured fiber glass discs 25 stacked along the length of said member 20. At the end of tubular member is a reduced diameter threaded boss 26 having a clamping nut 28 which bears against a closure plate 30 in engagement with the lowermost disc 25 to hold the stack of said discs 25 tightly together to prevent passage of liquid therebetween.

The end of the tubular member is sealed by the closure plate 30 and a fiber washer 32.

The fiber glass discs 25 may have a density of about 8 lbs. per cubic foot and the function thereof is to coalesce any of the emulsified water as it passes from the interior of the tubular member 20 through openings 22 and thence through the discs 25.

Within the interior 35 of the bowl 14 is a funnel shaped screen 36 of 90 x 90 mesh and it is preferably of Monel composition to resist corrosion. A retaining ring 38 at the larger diameter end of the screen 36 has the open end thereof doubled over to provide greater strength to the screen.

The smaller diameter end 40 of the screen is fitted into an opening 42 at the bottom of the bowl 14 so that free water which is separated from the liquid at the inner surface of the screen is funnelled downwardly where it collects in a chamber 44 defined by a surrounding spacer 46 which is of electrically nonconductive material such as clear plastic material, viz., styrene or the like. The spacer 46 is in engagement with the base 48 of the bowl and has a felt or rubber seal 49. At the opposite side of the spacer is an electrode 50 with a reduced diameter portion at each end thereof fitting within the spacer 46 and a second spacer 52 which, like spacer 46 is also of electrically nonconductive material, such as styrene, or the like. Both sides of the electrode have seals 51 which prevent fluid leakage across the surfaces.

A capillary opening 45 in the electrode 50 provides an outlet for the water accumulated in chamber 44, this water being then passed through a larger diameter opening 53 in spacer 52 and the end plate 57 to the line 54 which connects to return line 55 leading back to the main header 12. A solenoid valve 56 controls passage of fluid from chamber 44 through line 54 to the return line 55.

The electrode 50 which is supported between nonconductive spacers 46 and 52 has a metal screw 60 making contact with a conductor 61 connected to one terminal of a battery 62. The other terminal side of the battery has a conductor 63 with a resistance element 65, a relay 67 and terminates with a connection by screw 68 to the base 48 of the bowl 14. Electrical contact between the electrode 50 and the base of the bowl 14 is made by water accumulating in the chamber 44 and which, when rising to the level of the base 48 of the bowl effects closing of the circuit between the electrode and the bowl so that current will then flow through conductors 61 and 69 to energize the relay 67.

The relay 67 effects closing of switch 70 to provide a circuit from conductor 71 through alarm bell 72, conductor 73, switch 70 and conductor 75.

If detection of amount of water is the extent of the information desired then the additional electrical components are not necessary. However, if information is requested as to percentages of water content of the liquid, then a circuit for controlling operation of solenoid valve 56 is included. This additional circuit comprises conductor 75, solenoid valve 56, conductor 78, timer 80 and conductor 81.

The timer 80 is set to close the described circuit at regular intervals to operate solenoid valve 56 so that the water content of chamber 44 accumulated during the time period becomes discharged as previously described through capillary opening 45 to line 54, return line 55 and back to the header 12. If during the time period between successive operations of the solenoid valve, sufficient water has not accumulated in the chamber 44, to make contact between electrode 50 and the electrode formed by the base 48 of the bowl, then no indication is made by the device.

If sufficient water does accumulate in chamber 44 during the allotted time period to make contact between the electrodes 50 and portion 48 then the device will signal such fact evidencing that a critical percent of water content of the liquid has been reached.

When only detection of an amount of water is desired, then the circuit containing the timer 80 is not used and a variable flow of diverted fluid through line 11 to the device 10 may occur. It is necessary to provide some positive pressure on the fluid to produce a flow through said device, a pressure of about 1 to 4 lbs. per square inch under average flow conditions being sufficient. To produce this pressure differential a restricted orifice 82 is provided between the inlet for line 11 and the outlet from return line 55. Thus, the liquid is caused to flow under pressure from line 11 through the discs 25 as previously described, past screen 36 (where free water is separated) and into passage 85, thence to return line 55 via T connection 86 which leads back to the header 12.

Where percentage of water content of a critical amount is to be sensed, there must be a constant flow of liquid diverted to the device 10 since percentage of water content is predicated upon an amount of water accumulated per a unit of time. This means that regardless of rate of flow of liquid in header 12, a constant pressure differential must be maintained between inlet and discharge lines 11 and 55. And to accomplish the constant pressure differential ensuring a constant fluid flow diverted to tester, a constant pressure differential valve 90 (FIGURE 2) is used.

The valve 90 comprises a spring loaded valve head 92 which is urged by spring 93 against valve seat 94. The valve head 92 has a stem 95 received through an opening 96 in guide 97 to ensure proper seating of the valve head 92.

In operation, assuming that water detection as to amount is the item of information desired, then the circuit containing the timer 80 is omitted and orifice 82 is satisfactory.

A variable flow of liquid from header 12 is diverted through line 11 under a pressure of about 1–4 p.s.i. The liquid passes into tubular member 20 and out the openings 22 where it then passes through discs 25 which coalesce any emulsified water, converting it to free water. When the liquid emerges from the discs 25 it then encounters screen 36 which separates the free water.

The fluid having water separated therefrom returns to the header 12 via passage 85 and return line 55 while the free water filtered out at the inner surface of the screen 36 will funnel downwardly and accumulate in chamber 44.

If the accumulated water in chamber 44 reaches the level of the base of the bowl 14 to contact portion 48 then electrical contact is made between electrode 50 and the metallic bowl 14 so that current will flow through the circuit: electrode 50, conductor 61, battery 62, conductor 63, resistance 65, relay 67, conductor 69, bowl 14, and through water content of chamber 44 to electrode 50.

Energization of the relay 67 will close switch 70 and complete the circuit: conductor 71, bell 72, conductor 73, switch 70, conductor 75. The audible warning will evidence reaching the predetermined water amount.

The chamber 44 is then cleared of its water content by manually opening valve 56 to discharge the water through the capillary 45 (which causes a pressure differential for forcing the water out) and into line 54 connecting with return line 55 where it is discharged into the main header 12.

The operation may then resume.

If it is desired to measure the percent of water content of the liquid to obtain an indication if a critical percent of water content is reached or exceeded, then the operation is the same as described except that the electrical circuit containing timer 80 is added and orifice means such as the one shown in FIGURE 2 are used to ensure constant rate of fluid flow diverted to the tester 10 regardless of flow rate in the main header 12.

In this arrangement, the timer 80 will function at set time intervals to complete the circuit conductor 75, solenoid valve 56, conductor 78, timer 80, conductor 81 so that the water content of chamber 44 is discharged. If, during this time, the accumulated water in chamber 44 has not effected contact between electrode 50 and bowl 14 to complete the circuit between conductors 61 and 69 this means that the critical percent of water has not been reached. The reason for this is that over the set time period, at a constant liquid flow through the device 10 the fixed amount of liquid has not yielded sufficient water to chamber 44. The operation will proceed continuously with the chamber 44 emptying of its water content at the end of each time period.

If the critical percent of water content should be reached then sufficient water will accumulate in chamber 44 during the time interval to complete the circuit between electrode 50 and bowl 14 to provide current flow from conductor 61 to conductor 69, energizing relay 67 to close switch 70 and thereby complete the circuit for sounding the alarm bell 72.

If a continuous record is desired of the percent of water content of a fluid during its passage in the main header, then the chamber 44 is allowed to fill and be discharged continuously and from the lapsed time for each fill the total amount of liquid containing such amount is established because the rate of flow to the tester is constant. Suitable instrumentation devices are well known and can be readily used for calibrating the lapsed time in terms of percentage of water content. Thereby a continuous record is available as to percentage of water content of the fluid although it is itself continuously flowing.

The device is further adapted for measuring the amount of oil or the like fluid contained in water. In this case the bowl 14 is simply inverted so that the chamber 44 is at the upper end of the bowl 14 instead of the lower end.

In this instance, an accumulation of oil, floating to the top of the water in excess of a predetermined amount will displace water from chamber 44 and interrupt electrical contact between electrode 50 and bowl 14 to break the circuit between conductors 61 and 69 thereby signalling the presence of oil in an amount greater than a predetermined amount. Suitable arrangement may also be made for basing the amount of oil on a percent figure by applying the foregoing teachings.

Other revisions and variations of the invention will readily suggest themselves to those skilled in the art, and it is intended that such revisions and variations as incorporate the herein disclosed principles will be included within the scope of the following claims.

I claim:

1. A device for detecting and measuring the amount of free and emulsified water in a liquid such as fuels and the like comprising means for diverting a substantially constant flow of said liquid during passage thereof, a coalescing medium through which said diverted flow is passed to produce freeing of the emulsified water therein, a foraminous member arranged in the path of flow of said liquid flow from said coalescing medium to effect separation of the free water from said liquid which is caused to pass therethrough, said foraminous member substantially surrounding said coalescing medium, a chamber for receiving said separated free water, electrical contact means adapted to form contact therebetween through the water contained in said chamber at a predetermined water content, and means for discharging said chamber at regular intervals, whereby accumulation of water in said chamber to form said contact is effected at or above predetermined percentages of water content of said fuel.

2. A device for detecting free and emulsified water content of liquids, such as fuels and the like, comprising passage means for continuously conducting a diverted flow of said liquid and water content thereof, a coalescing medium through which the diverted flow is caused to pass for effecting freeing of the emulsified water in said flow, a conical shaped foraminous member surrounding said coalescing medium with the smaller diameter end positioned in a downward direction, a container proportioned to hold said foraminous member and to receive said diverted flow discharging from said coalescing medium, said foraminous member being adapted to separate the free water from said fuel as the fuel is caused to flow therethrough and to funnel said water toward the smaller diameter end thereof, a chamber for collecting the separated free water funnelling downwardly in said foraminous member, and means for measuring the rate of accumulation of said free water in said chamber.

3. The structure of claim 2 including passage means for returning the diverted flow of fuel from said container to the mainstream thereof after it has passed through said foraminous member.

4. The structure of claim 3 wherein restricted outlet means are provided for discharging the contents of said chamber whereby said chamber is emptied under positive fluid pressure, within said container, and means for controlling said outlet means.

5. The structure of claim 3 wherein means are provided for discharging the water content of said chamber responsively to contact between said electrodes effected by the water content therein, and means for determining the frequency of time of said discharge to establish the percentage water content of said liquid.

References Cited in the file of this patent

UNITED STATES PATENTS

| | | |
|---|---|---|
| 2,136,170 | Luertzing | Nov. 8, 1938 |
| 2,519,081 | Skarstrom | Aug. 15, 1950 |
| 2,807,956 | Doble | Oct. 1, 1957 |
| 2,960,234 | Frederickson | Nov. 15, 1960 |
| 2,970,468 | Price | Feb. 7, 1961 |

FOREIGN PATENTS

| | | |
|---|---|---|
| 567,093 | Canada | Dec. 9, 1958 |